April 10, 1951     H. KOCH     2,548,165
KITCHEN UTENSIL FOR CORING FRANKFURTERS Filed Dec. 29, 1949

Inventor

HENRY KOCH

By Chas W Hull

Attorney

Patented Apr. 10, 1951

2,548,165

UNITED STATES PATENT OFFICE 2,548,165

KITCHEN UTENSIL FOR CORING FRANKFURTERS

Henry Koch, Harrisburg, Pa.

Application December 29, 1949, Serial No. 135,648

4 Claims. (Cl. 30—124)

The present improvements relate to kitchen utensils, and more particularly to a hand tool for removing an axial portion of an elongated object of food, such as a frankfurter.

While commercial machines for removing the core portion of a frankfurter are known, the present improvements are designed as a hand tool for removing the axial portion of the edible, by a chef or housewife at the time of eating.

It is not uncommon to use relish, mustard or other flavoring material, in a roll along with the frankfurter and, in such practice, these elements usually drip or squirt out, when the item is bitten. With the invention of this application, however, the individual may avoid such possibilities, by removing the meat along the axis of the frankfurter, thereby creating an axial cylindrical chamber. The relish, mustard, or the like, may then be inserted within the frankfurter, and the latter inserted in the roll. When the object is then bitten, there is no soiling of the hands or clothes since the relish or mustard is contained in confinement and cannot leak out.

A primary object, therefore, is the provision of a handy, kitchen utensil of the character set forth, which is compact, and may be readily manipulated by the hands of the housewife.

A further object is the provision of a compact utensil, which may be readily cleansed after use, and stored away in a sanitary condition. The utensil is also designed to conceal the greater portion of the parts from the collection of dust, dirt, etc., when not in use.

These and other objects will be apparent upon reference to the accompanying specification and drawings, in which Fig. 1 is a perspective view of one embodiment of the invention.

Figure 2:
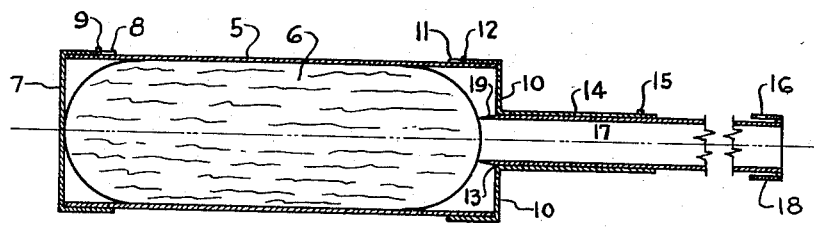
Fig. 2 is a sectional view of the utensils illustrated in Fig. 1, in a condition ready for use, with parts broken.

The preferred embodiment of the invention illustrated consists of a cylindrical tube or housing member 5 having a length and diameter to snugly accommodate a frankfurter 6. In Fig. 2, the frankfurter is shown illustrated within the member 5.

A cover 7 is provided at one end of the member 5, and is equipped with a slot 8 to removably engage pin 9 on the member 5.

The opposite end of cylindrical member 5 has a cap 10 having a slot 11 to removably engage pin 12 on the member 5. The cap 10 has an aperture 13 which is provided about the longitudinal axis of member 5. A cylindrical neck member 14 is secured to said cap 10 about aperture 13, in any desired manner, and is provided with a pin 15 as illustrated.

Figure 1:
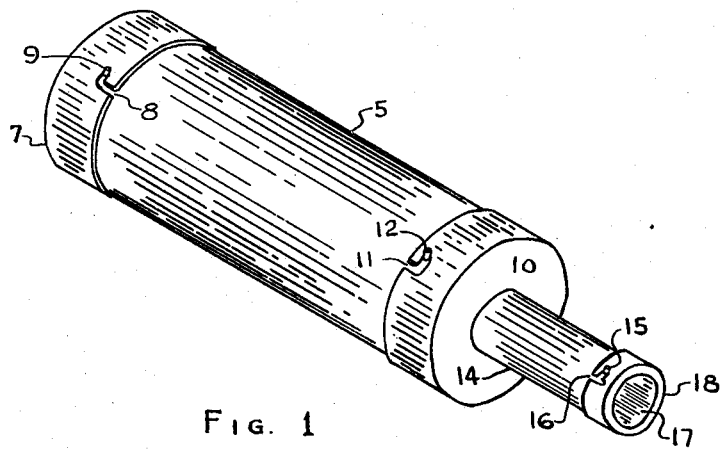

A cylindrical coring member 17 is slidably mounted within the aperture 13 and neck member 14, and has a handle or grip 18 provided with a slot 16. As seen in Figs. 1 and 2, these members are removably secured by means of the slot and pin arrangement.

Figure 3:
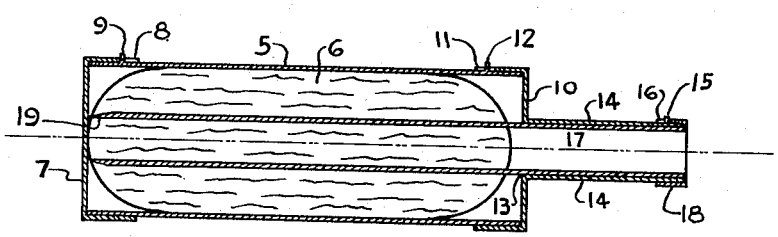
Fig. 3, is a sectional view of the device shown in Figs. 1 and 2, showing the operation completed.

In Figs. 2 and 3, it will be noted that the inner end of coring member 17 is provided with a sharpened portion in the form of an annular knife 19.

In the preferred form of the invention, the neck member 14 projects outwardly a substantial distance from the cap 10, while the coring member 17 has a snug fit inside neck member 14. This arrangement insures axial alignment of the coring member and knife 19, during its advance into the frankfurter 6.

In use, the coring member 17 is withdrawn to the position shown in Fig. 2. The frankfurter 6 may be inserted, from either end of the tube 5, by removing either cap 10 or cover 7. After the frankfurter is disposed within the tube 5, the cap or cover is replaced and locked by the slot and pin arrangement, as seen in Fig. 2.

The operator then holds the tube 5 in one hand, and grasps the grip 18 with the other. A slight longitudinal pressure is applied by the hands, thus bringing the knife 19 into engagement with the end skin of the frankfurter. When this engagement is effected, the tube 5 and member 17 may be twisted relative to each other so that the knife 19 may cut through the skin. Thereupon, additional pressure may be applied, so that the member 17 advances through the axial portion of the frankfurter, cutting a core of meat as it proceeds. When it reaches the other end of the frankfurter, the skin there may be cut also, if desired, as seen in Fig. 3. In this view, the member 17 is at the limit of its advance, and it is filled with a core of meat.

Having achieved the cutting of the core, the operator withdraws member 17 from tube 5, or vice versa, and the frankfurter then has a bore or axial portion without meat. Thereupon, cap 10 or cover 7 may be removed, and the frankfurter extruded in any desired manner.

The core of meat remaining in the member 17 may likewise be extruded in any desired manner, in order to prepare the utensil for further use.

In certain types of frankfurters, there is no outer skin and, in that event, the member 17 may be forced through the frankfurter without the aforementioned twisting motion.

In either event, it is significant that the cylindrical wall of the tube or housing 5 engages the frankfurter and confines and holds it against being distorted out of shape, while the member 17 is forced through it. Moreover, the cover 7, being locked by the pin and slot arrangement, contributes to the confinement of the frankfurter and assists in retaining it against shifting movement. This cooperation of parts further insures an axial, cylindrical cut through the longitudinal axis of the frankfurter.

After the utensil has served its purpose, the cover 7, cap 10 and member 17 may be removed, immersed in water along with tube 5, and thoroughly cleansed. It may then be re-assembled and stored away in a sanitary condition. It is understood, of course, that the improvements may be used to remove the central portion of other edibles, such as buns, bread or the like.

While the improvements have been illustrated in one embodiment, it is understood that they may take other forms, without departing from the purview of the appended claims.

What I claim as my invention is:

1. A kitchen utensil for coring frankfurters adapted for manual manipulation, comprising a cylindrical tube for accommodating a frankfurter, a removable cover at one end of said tube, a cylindrical cap at the other end of said tube, said cap having an axially disposed aperture, a cylindrical neck member on said cap aligned with said aperture, a cylindrical coring member slidably mounted within said cap and neck member, said coring member having an annular knife portion at one end thereof, and means for removably securing said coring member to said neck member.

2. A kitchen utensil for coring frankfurters adapted for manual manipulation, comprising a cylindrical tube for accommodating a frankfurter, a cylindrical cap at one end of said tube, said cap having an axially disposed aperture, a cylindrical neck member on said cap, aligned with said aperture, a cylindrical coring member slidably mounted within said cap and neck member, said coring member having an annular knife portion at one end thereof, and slot and pin means for removably securing said coring member to said neck member.

3. A kitchen utensil for coring frankfurters adapted for manual manipulation, comprising a cylindrical tube for accommodating a frankfurter, a removable cover at one end of said tube, a cylindrical cap removably mounted across the other end of said tube, said cap having an axially disposed aperture, a cylindrical neck member on said cap aligned with said aperture, a cylindrical coring member slidably mounted within said cap and neck member, said coring member having an annular knife portion at one end thereof, and slot and pin means for removably securing said cover to said tube and said cap to said coring member.

4. A kitchen utensil for coring frankfurters, adapted for manual manipulation, comprising an elongated housing having an inner surface for snugly engaging a frankfurter, a removable cover for one end of said housing, a closure for the other end of said housing, said closure having a guide means disposed axially of said closure and housing, and an elongated cylindrical coring member snugly engaging and slidably mounted within said guide means, said coring member having an annular knife portion at its innermost end.

HENRY KOCH.

REFERENCES CITED

The following references are of record in the file of this patent:

UNITED STATES PATENTS

| Number | Name | Date |
|---|---|---|
| 1,191,588 | Groom | July 18, 1916 |
| 1,605,677 | McCarthy | Nov. 2, 1926 |
| 2,036,365 | Senft | Apr. 7, 1936 |